(No Model.) 5 Sheets—Sheet 1.

E. REMY.
DYE VAT.

No. 433,632. Patented Aug. 5, 1890.

Witnesses:
George Barry.
D. H. Hayford.

Inventor
Emile Remy
by attorneys
Brown & Seward (No Model.)　　　　　　　　E. REMY.　　　　　5 Sheets—Sheet 2.
DYE VAT.

No. 433,632.　　　　　　　　　　　Patented Aug. 5, 1890.

Witnesses:—
George Barry
A. W. Hayward

Inventor:—
Emil Remy
by attorneys

UNITED STATES PATENT OFFICE.

EMILE REMY, OF MÜLHAUSEN, GERMANY.

DYE-VAT.

SPECIFICATION forming part of Letters Patent No. 433,632, dated August 5, 1890.

Application filed February 20, 1890. Serial No. 341,230. (No model.)

*To all whom it may concern:*

Be it known that I, EMILE REMY, of Mülhausen, Alsace-Lorraine, German Empire, have invented certain new and useful Improvements in Apparatus for Treating Fabrics, Paper, and other Material with Gases, Steam, &c., of which the following is a specification.

This invention relates to apparatus in which fabrics, paper, yarns, and other material can be exposed within a comparatively small space during a certain period of time and with as great a surface or area as possible to the action or treatment of gases, steam, or hot air, and in which the material under treatment can enter and leave the apparatus in a continuous and automatic manner.

The improvements consist in improved devices by which the fabric, paper, yarn, &c., (hereinafter referred to as "material,") entering the apparatus is automatically shaped into long folds that hang down side by side, whereby such material during its travel through the apparatus will offer or expose a large surface to the action of gases, steam, or hot air within the apparatus. The apparatus with these improved devices may be entirely or partly closed, openings being, however, provided for the material under treatment to enter and leave the apparatus, and also for the means used to actuate the parts within the apparatus.

Figure 1:
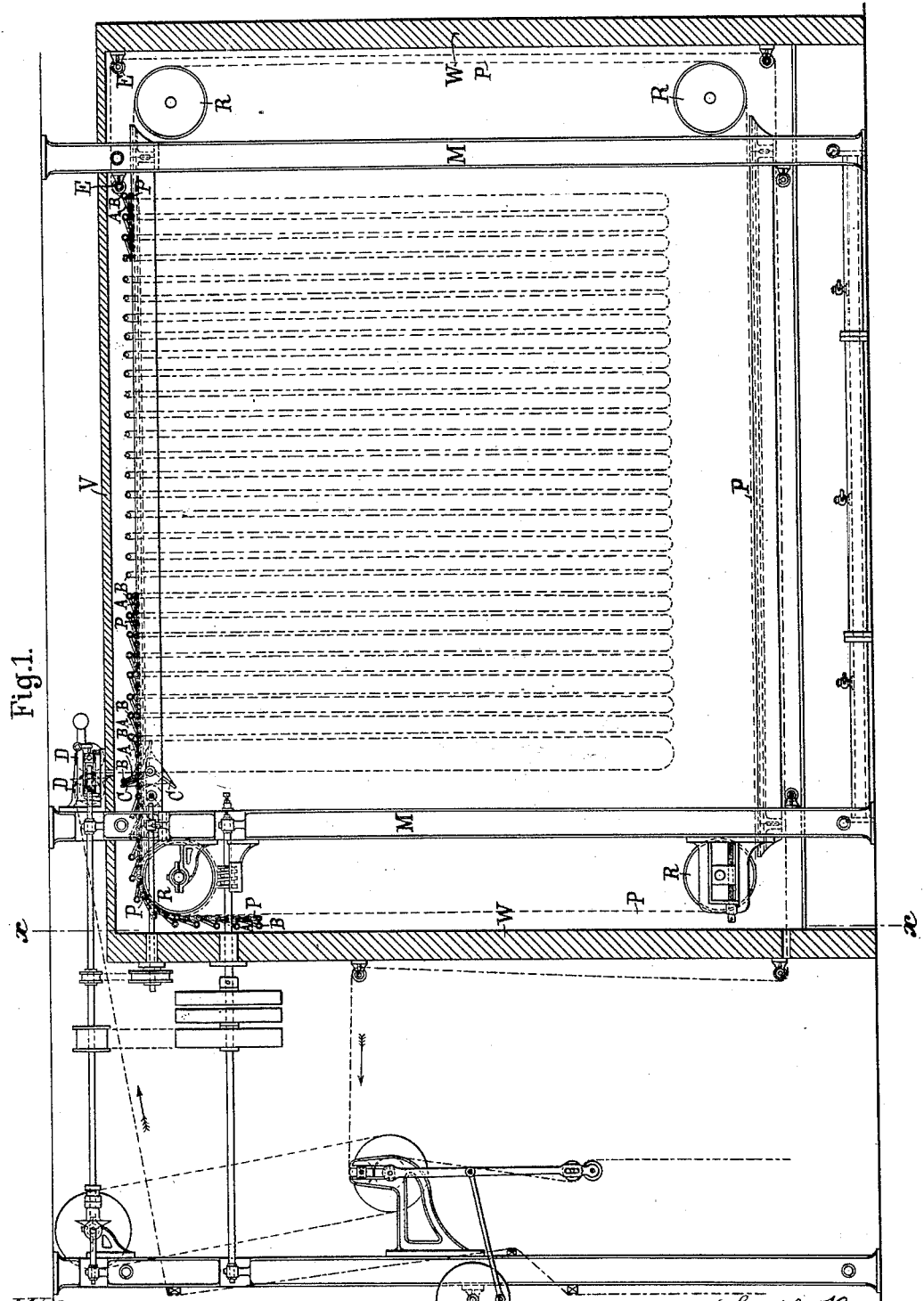
Figure 2:
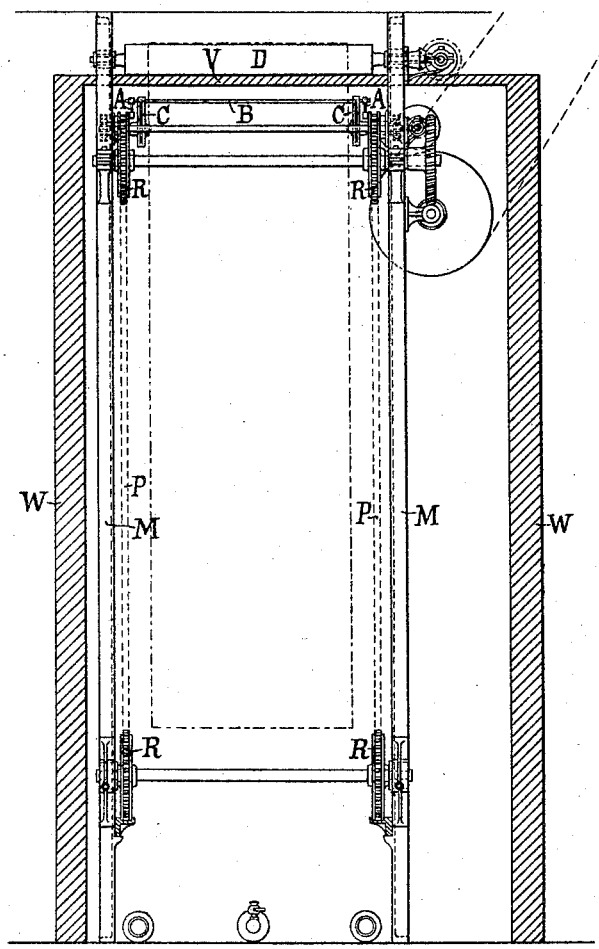
Figure 3:
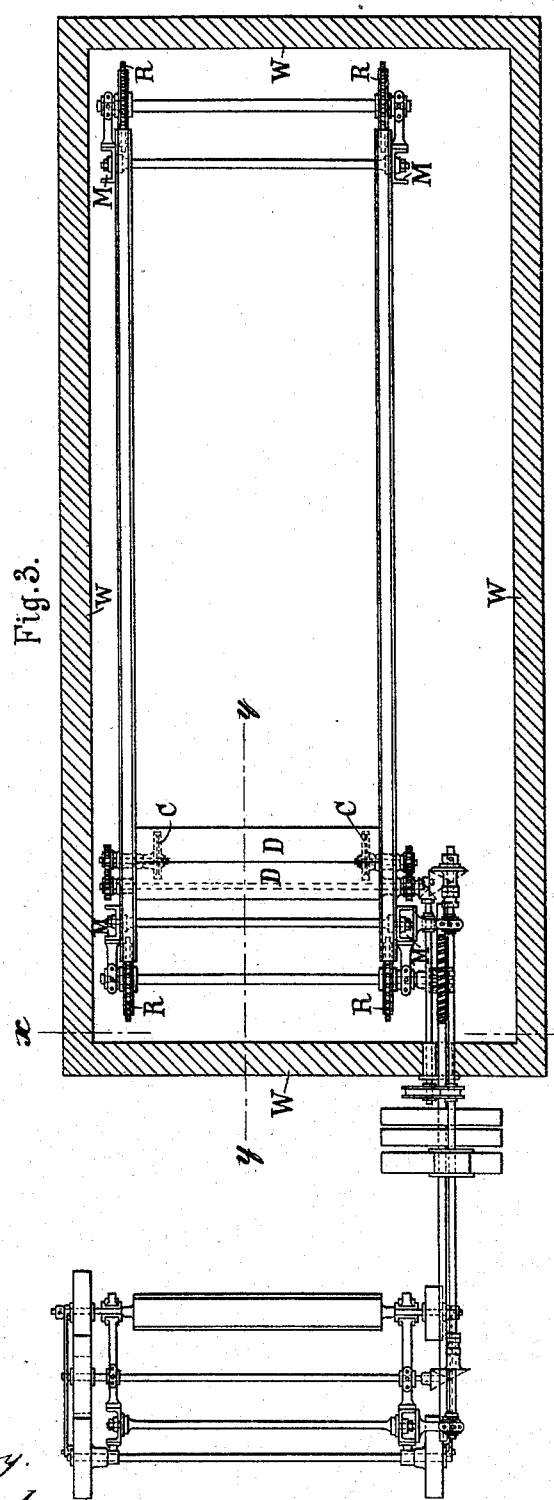
Figure 4:
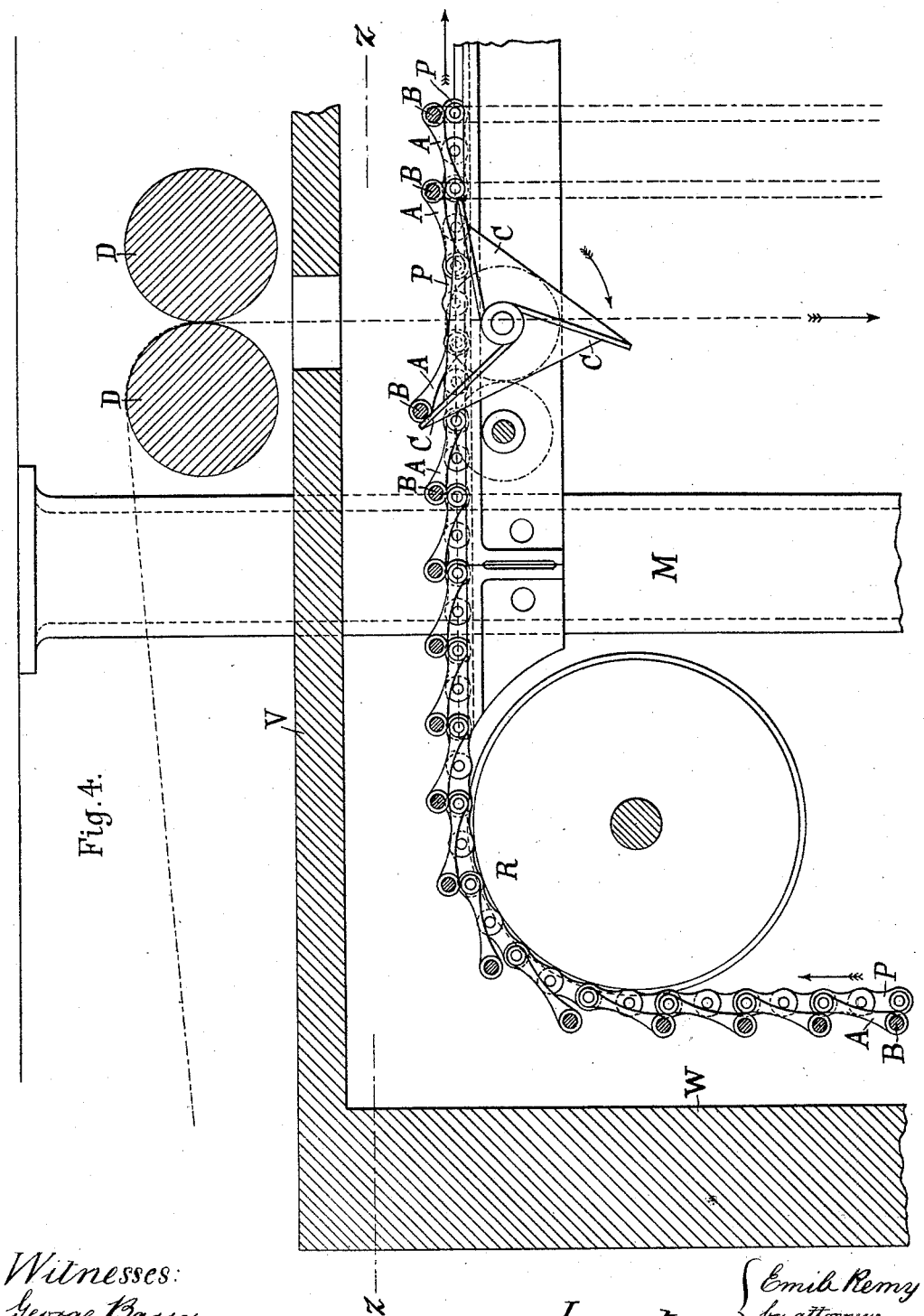
Figure 5:
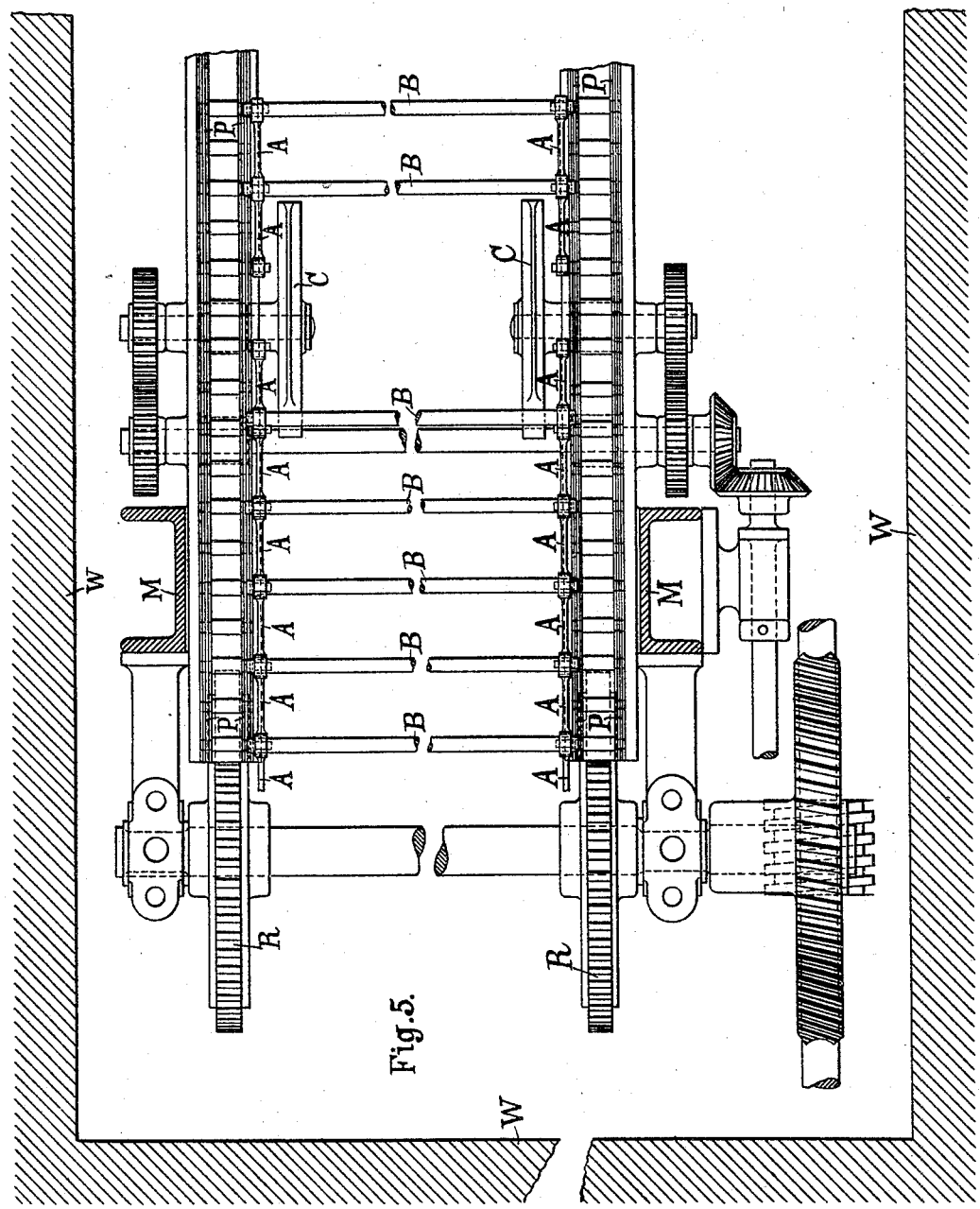

Figure 1 represents a side view of the apparatus, having omitted one of the side walls by which it is inclosed, and showing the end walls and cover in section. Fig. 2 represents a transverse vertical section in the line $x\,x$ of Figs. 1 and 3, viewed from the left. Fig. 3 represents a plan of the apparatus with the cover removed and side and end walls in section. Fig. 4 represents a vertical section in the line $y\,y$ of Fig. 3, and on a larger scale than Figs. 1, 2, and 3, of that part of the apparatus at which the material enters. Fig. 5 is a horizontal sectional view corresponding with Fig. 4, taken in the line $z\,z$ of that figure.

Similar letters of reference designate corresponding parts in all the figures.

Within the apparatus are vertical uprights M, that carry the moving and guiding mechanism. This mechanism comprises eight chain-wheels R, divided into two sets, each set of four wheels lying in a common vertical plane and each set being surrounded by an endless chain P. The two chains each receive a traveling motion from one or more of their chain-wheels R. To the links of the chains P P are attached at suitable distances apart short arms or levers A, each capable of turning about a center. Each two of these arms or levers A, constituting a set and in corresponding positions on the two chains, are connected together by a bar, rod, or roller B. When the chains are traveling, each set of two arms A thus connected by a rod B will at the entrance end of the apparatus hang in a downward position and in a contrary direction to that in which the chains are traveling.

At a suitable position and near to that point at which the material to be treated is fed into the apparatus by rotating feeding-rollers D D is mounted a set of turnstiles C, capable of rotating at a higher speed than the traveling speed of the endless chains P P. If now the material to be treated enters the apparatus between the endless chains P in a downward vertical direction, the revolving turnstiles C will take underneath the next rod B, arriving with the traveling chains, and will lift such rod with its two arms A, and will turn the rod and arms over in the opposite direction—that is, in a forward direction—so that the arms are then in a position corresponding with the traveling direction of the chains. During the lifting of the rod B the latter has been brought underneath the entering material, which latter in continuing its downward travel will form a vertically-hanging fold or plait until the turnstiles C have lifted the next rod B and brought the same underneath the entering material, so as to form a second fold or plait similar to the first. As the endless chains continuously travel onward, and the turnstiles C, however, after the turning over of a rod B, are somewhat retarded in their rotation, there will always be an appropriate period of time between the action of the turnstiles on two successive rods B for the automatic formation of the material into folds or plaits, one after the other, in the manner described. The length of such folds or plaits may be regulated at will. This action of turning the rods B over from a rearward into a forward position is constantly repeated, so that the material under treatment is caused to travel with the chains P through the greater part of the space or length of the apparatus in long downwardly-hanging folds or plaits until it arrives near the end of the uppermost portion of the length of the chains, where the material is conducted over guide-rollers E, and either directly leaves the apparatus or is guided downwardly and then horizontally below the endless chains, as shown, back to the entrance side of the apparatus. This latter course is most advantageous, on account of the material being further subjected to the influence of the gas, steam, or hot air.

The driving of the mechanism will be readily understood from the drawings, and does not require any further description.

The apparatus may be provided with apertures for the exit of moisture, and may be connected by these apertures with ventilators or exhausters for the expulsion of moist air, &c.

What I claim as my invention is—

The combination, with an apparatus for feeding fabrics, of parallel endless chains, wheels for supporting the said chains, mechanism for driving them slower than the feeding of the fabric, swinging arms or levers pivoted to said chains, transverse bars carried by said arms or levers to receive the fabric from the feeding apparatus, and a rotary turnstile for turning over said swinging arms or levers and bars, substantially as and for the purpose herein set forth.

In testimony that I claim the foregoing as my invention I have signed my name in presence of two subscribing witnesses.

EMILE REMY.

Witnesses:
 JULES PLATUN,
 EDOUARD SCHLEOD.